Oct. 15, 1940.                W. MAHNKEN                2,217,759
                             SWITCHING MEANS
                           Filed Nov. 3, 1938
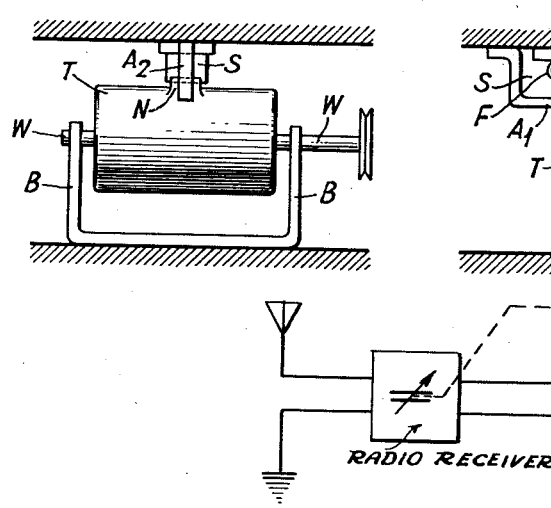
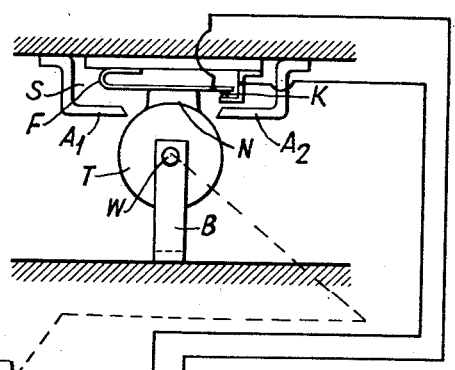
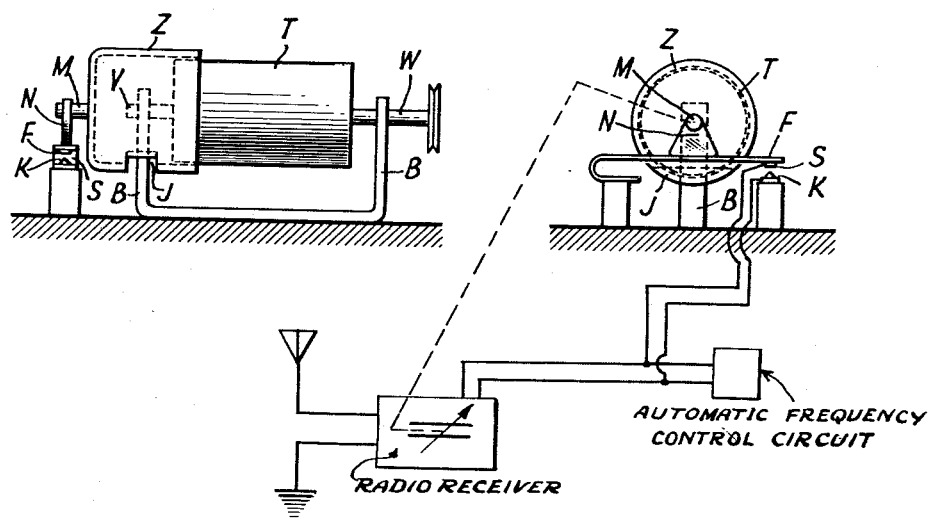
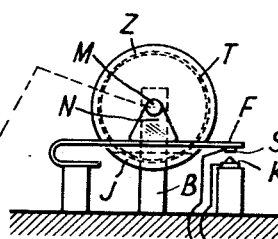
INVENTOR
WERNER MAHNKEN
BY
ATTORNEY Patented Oct. 15, 1940

2,217,759

UNITED STATES PATENT OFFICE 2,217,759

SWITCHING MEANS

Werner Mahnken, Berlin, Germany, assignor to Telefunken Gesellschaft für Drahtlose Telegraphie m. b. H., Berlin, Germany Application November 3, 1938, Serial No. 238,529
In Germany October 21, 1937

2 Claims. (Cl. 250—20)

In receiver sets with motor-driven automatic tuning, it is known in the prior art to cause the motor current to actuate a relay which will cause circuit changes while the motor is running, for instance, discontinuance of the reproduction for the purpose of insuring silent tuning or which renders means adapted to automatic sharp tuning inoperative or else causes a telltale lamp to flash up.

A costly and not always reliably operating relay switch is dispensed with according to the invention by journaling the stator of the motor inside an angle of rotation limited by stops and by causing the stator to actuate the switch while the motor is running and when it has a position differing from its normal position.

Preferred embodiments of the invention are shown in the drawing wherein Fig. 1 shows a side elevation and in Fig. 2 showing a front elevation of an embodiment of the invention showing a switch opening arrangement and Figs. 3 and 4 illustrate side elevation and front elevation respectively of another embodiment of the invention which shows a switch closing device.

Supported and journaled in the stationary clip or bow member B Figs. 1 and 2 are the two butts of the shaft W of the motor. Apart from the shaft only the stator case T is shown of the motor. The stator shell is not connected with a stationary part, in fact, inside a small range of rotation it is free to revolve about the rotor. On top of the stator is fixed a roughly rectangular cam N. Laterally of the said cam are two fixed stops A1 and A2 which confine or limit the movements of the cam and thus of the stator to a small angle. In either of the two positions of the stator, the cam causes actuation of the fixed switch S in that it causes the spring F to be lifted clear of the stationary cooperating contact K.

Now, as long as the motor is running, a torque is exerted upon the stator which as to size is equal to the torque of the rotor, though being of opposite direction. Hence, the stator will come to make pressure engagement with the stop A1 by action of this torque during clockwise rotation of the rotor, while when the rotor runs in the contrary direction, it will come to bear against the stop A2. In either case, the switch S is simultaneously caused to operate. When the rotor comes to a stop, the torque will also cease. Now, arrangements may be made in such a way that the pressure exerted by the spring F will force the cam conjointly with the stator back into the normal or neutral position as shown. Where the spring force is comparatively weak, however, it will be recommendable to provide a distinct restoring torque which will always tend to return the stator to the median position. This is accomplishable by the agency of a torsion spring secured between the clip and the stator or else by making the lower portion of the stator heavier so that the restoring torque will be set up by virtue of gravity.

From Fig. 2 it will be evident that the switch is utilized to disconnect the loudspeaker LS from the radio receiver when the motor is in operation.

If desired, either one or both the above stops may be dispensed with by choosing a special form of construction for the switch.

In the form of construction shown in Fig. 3 and Fig. 4, the stator is fitted with a cylindrical cap Z having a slit J on its under part or face through which the stationary clip or bow B is passed. The said slit serves simultaneously for limiting the free angle of rotation of the stator. The cap Z, in turn, is fitted with a short shaft butt M to which the cam N is attached which actuates the stationary switch S in a way similar to that described in connection with Figs. 1 and 2. The switch is secured upon the same base or mounting plate as the bow or clip member B.

From Fig. 4 it will be evident that the switch SK is used to close a circuit when the motor is in operation. The control circuit may be a telltale light to show that the motor is in operation or any other suitable device.

The arrangements hereinbefore disclosed are particularly suited for motor tuned receiver apparatus. In such a set which at the same time comprises means for electrical sharp tuning by re-adjustment of the local heterodyne oscillation, it is preferable to include the switch S in the lead of the control voltage for automatic sharp tuning with the result that the sharp tuning means are inoperative while the motor is running. At the same time, by the same or else by an additional cam another switch may be operated designed to wholly or partly cause reproduction to cease.

I claim:

1. In radio receiving apparatus, a reversible electric tuning motor, a normally disconnected control circuit for said apparatus, a pivoted stator for said motor arranged to swing in either direction opposite to that of the rotation of the motor when the motor is in operation, stops for limiting the swing of said stator in either direction of movement thereof, switching means for connecting the control circuit to said apparatus, and means operated by displacement of said stator for operating said switching means whereby the control circuit is connected to said apparatus when the motor is in operation.

2. In radio signalling apparatus, an electric motor for controlling an operation of said apparatus, an operable switch, a yoke-like frame, a stator for said motor pivoted between the two ends of the yoke and arranged so as to rotate from a position of rest about its axis in a direction opposite to the direction of rotation of the motor, a cylindrical cap fixed to one end of said stator, said cap being provided with a slit through which a leg of said yoke passes, said slit being arranged to limit the movement of said stator, and means on said cap for operating said switch upon displacement of said stator from its position of rest.

WERNER MAHNKEN.